United States Patent [19]

Furlenmeier et al.

[11] 3,917,584

[45] *Nov. 4, 1975

[54] 6-ACYL DERIVATIVES OF AMINOPENICILLANIC ACID

[75] Inventors: André Furlenmeier, Basel; Paul Lanz, Muttenz, both of Switzerland; Karl Vogler, deceased, late of Riehen, Switzerland, by Heinrich Vogler, Franziska Elizabeth Vogler, Niklaus Edward Vogler, heirs; Guido Zanetti, Reinach, Switzerland

[73] Assignee: Hoffmann-La Roche Inc., Nutley, N.J.

[ * ] Notice: The portion of the term of this patent subsequent to Apr. 9, 1991, has been disclaimed.

[22] Filed: Dec. 27, 1972

[21] Appl. No.: 318,738

[30] Foreign Application Priority Data
  Jan. 12, 1972  Switzerland............................ 435/72

[52] U.S. Cl............ 260/239.1; 260/471 R; 260/472; 424/271
[51] Int. Cl.² ......................................... C07D 499/44
[58] Field of Search .............................. 260/239.1

[56] References Cited
UNITED STATES PATENTS

| | | | |
|---|---|---|---|
| 3,647,783 | 3/1972 | Pirie................................. | 260/239.1 |
| 3,803,128 | 4/1974 | Furlenmeier et al. ........... | 260/239.1 |

FOREIGN PATENTS OR APPLICATIONS

| | | |
|---|---|---|
| 900,666 | 7/1962 | United Kingdom |

Primary Examiner—Paul M. Coughlan, Jr.
Attorney, Agent, or Firm—Samuel L. Welt; Jon S. Saxe; R. Hain Swope

[57] ABSTRACT

Novel antibiotic compounds represented by the formula

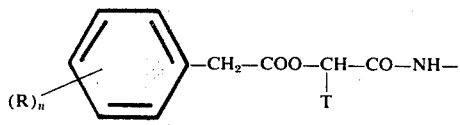

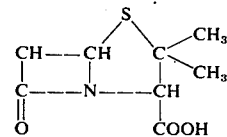

wherein R is halogen, lower alkyl, lower alkoxy, lower alkylamino, di-lower alkylamino or lower alkanoylamino, n is an integer of 0–2 and T is a $C_2$–$C_5$ alkyl group, pharmaceutically acceptable salts thereof and hydrates of such salts a process for their preparation and novel intermediates thereof are disclosed.

11 Claims, No Drawings

6-ACYL DERIVATIVES OF AMINOPENICILLANIC ACID

DETAILED DESCRIPTIOIN OF THE INVENTION

The present invention is directed to novel 6-acylaminopenicillanic acid compounds represented by the general formula

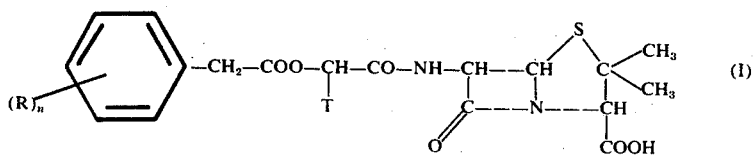

wherein R is halogen, lower alkyl, lower alkoxy, lower alkylamino, di-lower alkylamino or lower alkanyolamino, $n$ is an integer of 0-2 and T is a $C_2$-$C_5$ alkyl group, pharmaceutically acceptable salts thereof and hydrates of such salts.

The invention is also directed to the preparation of the compounds represented by formula I utilizing the novel intermediate cmpounds represented by the formula

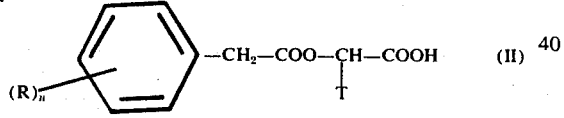

wherein R, n and T have the meanings given above and their reactive functional derivatives.

In accordance with the present invention, the term "halogen" represents all the halogens with fluorine, bromine and chlorine being preferred. Alkyl radicals represented by T in formulas I and II above may be straight- or branched-chain radicals containing 2 to 5 carbon atoms. Examples of such substituents include ethyl, n-propyl, isobutyl, n-pentyl, 3-methylbutyl and neopentyl with isobutyl being preferred. Lower alkyl and lower alkoxy radicals represented by R in the above formulae are straight- or branched-chain radicals containing 1 to 6 carbon atoms with methyl and methoxy, respectively, being preferred. The alkyl moiety of the mono- and di-lower alkylamino groups likewise may be straight- or branched-chain and contains from 1–6 carbon atoms with methyl substitution being preferred in each case. The alkyl portion of the lower alkanoylamido group also may be straight- or branched-chain and contains from 1 to 6 carbon atoms with the acetylamido group being preferred.

A preferred group of 6-aminopenicillanic acid compounds in accordance with the invention are those of formula I wherein T is isobutyl and $n$ is 0 or 1 in which case R is selected from the group consisting of chloro, methyl, methoxy, acetylamido or dimethylamino, pharmaceutically acceptable salts thereof and hydrates of such salts.

A particularly preferred group of penicillin compounds in accordance with the invention are set forth in the following Table. In the Table, the antimicrobial activity of the compounds tested is expressed in terms of the minimal inhibitory concentration in $\mu g./ml$. The minimal inhibitory concentration was determined by double dilution series in nutrient bouillon. The activity of the compounds was further demonstrated in vivo by establishing an oral $CD_{50}$ in the mouse against *Staphylococcus aureous* and *Escherichia coli*.

TABLE

| Compound | Minimum Inhibitory Concentration [$\mu g/ml$] | | $CF_{50}$ per os in the mouse [mg/kg] | |
|---|---|---|---|---|
| | S. aureous FDA | E. Coli 1346 | S. aureous (Schoch) | E. Coli 1346 |
| A | 0.156 | 78 | 2.0 | 17 |
| B | 0.156 | 20 | 3.6 | 70 |
| C | 0.312 | 78 | 8.1 | >93 |
| D | 0.156 | 39 | 2.2 | 13 |
| E | 0.02 | 19 | 10.0 | 12 |
| F | 0.156 | 0.625 | 10.8 | 47 | wherein the compounds tested are as follows.

| Compound | Name |
|---|---|
| A | [(R)-1-[(o-methoxyphenyl)-acetoxy]-3-methylbutyl] penicillin sodium |
| B | [(R,S)-1-[(p-methoxyphenyl)acetoxy]butyl] penicillin sodium |
| C | [(R,S)-1-[(p-acetamidophenyl)acetoxy]butyl] penicillin sodium |
| D | [(R)-1-[(p-methoxyphenyl)acetoxy]-3-methylbutyl] penicillin sodium |
| E | [(R)-1-[(p-chlorophenyl)acetoxy]-3-methylbutyl] penicillin sodium |
| F | [(R)-3-methyl-1-(phenylacetoxy)butyl] penicillin sodium |

A preferred group of acids within the scope of formula II and their reactive functional derivatives are those wherein T is isobutyl and $n$ is 0 or 1 in which case R is selected from the group consisting of chloro, methyl, methoxy, acetylamido and dimethylamino.

In accordance with the present invention, the compounds represented by formula I are prepared by reacting 6-aminopenicillanic acid, the carboxyl group of which is in a protected form, with the novel acids represented by formula II or a reactive functional derivative thereof. Such reactive functional derivatives include, for example: halides, e.g. chlorides, bromides or fluorides; azides; anhydrides-particularly mixed anhydrides with strong acids; reactive esters such as the N-hydroxysuccinimide esters, amides such as imidazolides and the like. After the reaction is completed, the protecting group is cleaved off and, if desired, the product is converted into a pharmaceutical salt.

Examples of methods whereby the carboxyl of 6-aminopenicillanic acid can be protected include conversion into a readily cleavable ester such as, for example, the benzyl ester, a p-bromophenacyl ester or a silyl ester such as the trimethyl silyl ester or by salt formation with an inorganic base or a tertiary organic base such as, for example, triethylamine. When the reaction of 6-aminopenicillanic acid and the acid represented by formula II is completed, the ester protecting group can be easily removed by methods known in the art. For example, a benzyl ester protecting group can be removed by catalytic hydrogenation utilizing a noble metal catalyst such as a palladium-carbon, a p-bromophenacyl ester group can be cleaved by means of treatment with an alkali metal thiophenolate and a silyl ester can readily be removed by treatment with water. When the carboxyl group is protected by salt formation, e.g. with triethylamine, cleavage is accomplished via treatment with acid at low temperatures, i.e. a temperature of from about 0°C. to about 10°C. Suitable acids include, for example, inorganic acids such as hydrochloric, sulfuric and phosphoric acids and organic acids such as citric acid and the like.

The reaction of 6-aminopenicillanic acid having a protected carboxyl and the compound represented by formula II is carried out by methods well known in the art of peptide chemistry. Thus, for example, the reaction is effected in the presence of a carbodiimide such as dicyclohexylcarbodiimide or an oxazolium salt such as N-ethyl-5-phenyl-isoxazolium-3'-sulfonate in an inert solvent. Suitable solvents include, for example, ethyl acetate, acetonitrile, dioxan, chloroform, methylene chloride, benzene, dimethylformamide and the like. In a like manner, a salt of a 6-aminopenicillanic acid such as, for example, a trialkylammonium salt is reacted with a reactive functional derivative of an acid represented by formula II in an inert solvent such as described above. The reactions are conveniently carried out at a temperature between about 5°C. and about −40°C., preferably at about 0°C.

The novel penicillin compounds represented by formula I, pharmaceuetical salts thereof and the acids represented by formula II can be present as optically pure isomers and as diastereomeric mixtures. The R-enantiomers, i.e. the acids of formula II and the compounds of formula I wherein the group

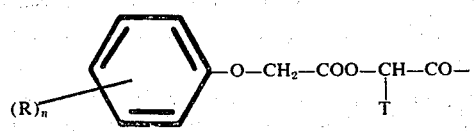

wherein R, n and T are as defined above
having the R configuration are preferred.

The novel acids represented by formula II can be prepared by treating a compound represented by the formula

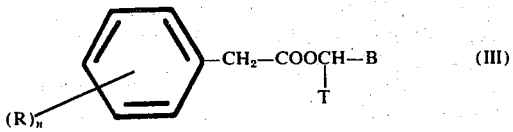 (III)

wherein R, n and T have the meanings given above and B is a protected carboxyl group
to convert it to the free carboxyl group.

The protected carboxyl group represented by B can be, for example, a readily cleavable ester group such as, for example, the benzyl ester or the t-butyl ester. The removal of the protecting group from the carboxyl can be carried out in the case of the benzyl group by catalytic hydrogenation utilizing a noble metal catalyst such as palladium/carbon and in the case of the t-butyl ester by acid hydrolysis utilizing a mineral acid such as the hydrochloric acid, an organic acid such as trifluoroacetic acid and the like. The conversion of the thus-obtained acid into reactive functional derivatives such as described above can be carried out by methods known in the art.

The compounds represented by formula III can be prepared by methods well known in the art. For example, the carboxyl group of a compound represented by the formula

 (IV)

where T has the meaning given above,
can be protected by conventional methods, e.g. by formation of the benzyl ester or t-butyl ester, and the resulting compound reacted with a compound represented by the formula

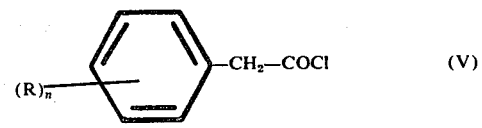 (V)

wherein R and n have the meaning given above.

The novel 6-acylaminopenicillanic acid compounds provided by the present invention possess a broad spectrum of activity against both gram-positive and gram-negative micro-organisms. Their antibiotic and bactericidal activity allows them to be utilized both therapeutically and as disinfectants. It is preferred in accordance with the invention to administer the novel penicillin compounds described herein orally in view of their superior stability against gastric acid. It is contemplated in the case of adults, that oral dosage forms containing 200–600 mg. are administered 3 or 4 times daily. This dosage regimen may be adjusted by the clinician as the therapeutic situation requires. The novel penicillin compounds of the invention may also be administered parenterally, rectally or topically in suitable dosage forms and may be administered in the form of their pharmaceutically acceptable salts or hydrates.

Examples of the pharmaceutically acceptable salts of the penicillin compounds represented by formula I include salts with inorganic bases such as, for example, the alkali metal salts for example, the sodium or potassium salt, ammonium salts, alkaline earth metal salts such as, for example, the calcium salt and the like and salts with organic bases such as amine compounds, for example, N-ethyl piperidine, procaine, dibenzylamine, N,N'-dibenzylethyl-ethylenediamine, alkylamines, dialkylamines or the like. These salts can also be hydrated. The hydration can be effected during the manufacturing process or can occur gradually as a consequence of the hygroscopic properties of an initially anhydrous salt.

For purposes of administration, the novel acyl derivatives of 6-aminopenicillanic acid of the present invention can be combined with conventional compatible organic or inorganic pharmaceutical carrier materials known in the art. Such materials include, for example, water, gelatin, gums, lactose, starches, magnesium stearate, talc, vegetable oils, polyalkylene glycols, petroleum jelly and the like. Such pharmaceutical preparations may be in unit dosage form and may additionally contain other therapeutically valuable substances or conventional pharmaceutical adjuvants such as preservatives, stabilizing agents, wetting agents, emulsifying agents, buffers and the like. The pharmaceutical preparations can be in conventional solid dosage forms such as tablets, capsules, dragees and the like, conventional semi-solid forms such as ointments and creams, conventional dosage forms such as dry ampules, suppositories and the like. Such preparations may be submitted to conventional pharmaceutical expedients such as, for example, sterilization and the like.

The following Examples further illustrate the invention. All temperatures are in degrees Centigrade.

EXAMPLE 1

A total of 264 g. of (R)-2-hydroxyisocaproic acid were dissolved in 1.8 litres of absolute dioxan in a 3-necked flask equipped with a stirrer, thermometer and reflux condenser having a calcium chloride tube. The solution was treated successively with 285 ml. of triethylamine and 236 ml. of benzyl chloride. The mixture was heated in an oil-bath for 20 hours to 100° (internal temperature) with stirring. After cooling, the precipitated triethylamine hydrochloride was filtered off and washed with 500 ml. of ethyl acetate. The filtrate was evaporated under reduced pressure at 50° and the residual oil was dissolved in 800 ml. of ethyl acetate and washed twice with 150 ml. portions of 3-N hydrochloric acid, twice with 100 ml. portions of 5% aqueous sodium chloride solution, twice with 150 ml. portions of 10% aqueous potassium bicarbonate solution and twice with 100 ml. portions of 5% sodium chloride solution. After each of these washings, the mixture was backwashed with 200 ml. of ethyl acetate. The combined ethyl acetate solutions were dried over magnesium sulfate and evaporated under reduced pressure at 50°. The resulting crude product was distilled at 0.3 Torr (112°–115°) to yield (R)-2-hydroxyisocaproic acid benzyl ester; $[\alpha]_D^{25} = +18.0°$ ($c = 1$ in methanol); $n_D^{23} = 1.498$.

A total of 16.6 g. of o-methoxyphenylacetic acid, 80 ml. of benzene and 30 ml. of thionyl chloride were boiled under reflux for 3 hours. The solution was evaporated under reduced pressure at 50°, combined with two 30 ml. portions of fresh benzene and evaporated each time and the residual o-methoxyphenylacetic acid chloride dried under reduced pressure at 50°.

The o-methoxyphenylacetic acid chloride thus-obtained was mixed with a solution of 22.2 g. of (R)-2-hydroxyisocaproic acid benzyl ester obtained above in 150 ml. of dioxan. A solution of 14 ml. of triethylamine in 30 ml. of dioxan was added dropwise over a period of 45 minutes while stirring at 25°–35° and subsequently the mixture was stirred for an additional 15 hours at 25°. The triethylamine hydrochloride was filtered off under suction and the filtrate evaporated under reduced pressure at 40°. The oil obtained was dissolved in 150 ml. of ethyl acetate and washed neutral in succession with 1-N hydrochloric acid, water, a 5% aqueous sodium bicarbonate solution and water, dried over magnesium sulfate and evaporated. There was obtained an oil which was chromatographed over silicagel with benzene. The uniform fractions, which contain the (R)-2-[(o-methoxyphenyl) acetoxy]-isocaproic acid benzyl ester, were combined and evaporated under reduced pressure and give an oil; $[\alpha]_D^{25} = +31°$ ($c = 2$ in alcohol).

Twenty five grams of the thus-obtained (R)-2-[(o-methoxyphenyl)acetoxy]isocaproic acid benzyl ester were hydrogenated in 200 ml. of alcohol after the addition of 2 g. of palladium/carbon (5%). After the uptake of the theoretical amount of hydrogen was completed, the catalyst was filtered off and the filtrate evaporated under reduced pressure at 40°. The residual oil was dissolved in excess 5% sodium bicarbonate solution and washed twice with 50 ml. portions of ether. The sodium bicarbonate solution was adjusted to a pH of 1 with concentrated hydrochloric acid and extracted twice with 100 ml. portions of ethyl acetate. The ethyl acetate solutions were washed twice with 50 ml. portions of water, dried over magnesium sulfate and evaporated under reduced pressure. (R)-2-[(o-methoxyphenyl)acetoxy]isocaproic acid was obtained in the form of a resin.

Nineteen grams of the previously obtained (R)-2-[(o-methoxyphenyl)acetoxy]isocaproic acid were boiled under reflux for 3 hours in 50 ml. of benzene and 20 ml. of thionyl chloride, evaporated under reduced pressure at 50°, combined twice with 30 ml. portions of benzene and evaporated each time. The residue was dried at 50° under reduced pressure. The crude (R)-2-[(o-methoxyphenyl)acetoxy]isocaproic acid chloride thus-obtained was dissolved in 50 ml. of chloroform and added dropwise at −5° with stirring to a solution of 14.7 g. of 6-aminopenicillanic acid in a mixture of 150 ml. of chloroform and 19 ml. of triethylamine. The mixture was stirred for 3 hours at −5° and allowed to stand for 10 hours at 0°. At the end of this period, the chloroform was distilled off under reduced pressure at 20° and the residue dissolved in 100 ml. of ice-water and washed twice with 50 ml. portions of ethyl acetate. The aqueous solution was adjusted to a pH of 2 at 5° with 3-N sulfuric acid and extracted twice with 100 ml. portions of ethyl acetate. The ethyl acetate solutions were combined and washed 4 times with 50 ml. portions of 10% aqueous sodium chloride solution, dried over magnesium sulfate and evaporated under reduced pressure at 20°. The resulting syrup obtained was dissolved in 30 ml. of ethyl acetate, treated with 34 ml. of a 2-N solution of sodium 2-ethylcaproate in ethyl acetate and precipitated with 30 ml. of absolute ether to yield [(R)-1-[(o-methoxyphenyl)-acetoxy]-3-methylbutyl] penicillin sodium which was recrystallized from water/isopropanol; melting point 159°–161° (decomposition); $[\alpha]_D^{25} = +208.1°$ ($c = 2.0$ in water).

EXAMPLE 2

A solution of 16.6 g. of p-methoxyphenylacetic acid, 14 ml. of triethylamine and 26.1 g. of 2-bromovaleric acid benzyl ester in 100 ml. of dimethylformamide was heated for 5 hours to 100°. After distillation of the dimethylformamide, the residue was suspended in 200 ml. of ethyl acetate and washed neutral with 3-N hydrochloric acid, water, 5% sodium bicarbonate solution and water, dried over magnesium sulfate and evaporated under reduced pressure. By chromatography over silicagel with benzene there was obtained pure (R,S)-2-[(p-methoxyphenyl)acetoxy]valeric acid benzyl ester as an oil.

A total of 16.5 g. of (R,S)-2-[(p-methoxyphenyl)-acetoxy] valeric acid benzyl ester in 200 ml. of alcohol was hydrogenated after the addition of 2 g. of palladium/carbon (5%). After the uptake of the theoretical amount of hydrogen was completed, the catalyst was filtered off and the filtrate evaporated under reduced pressure at 40°. The oil thus-obtained was dissolved in excess sodium bicarbonate solution and extracted twice with 50 ml. portions of ether. The pH of the sodium bicarbonate solution adjusted to pH 1 with concentrated hydrochloric acid and the solution extracted twice with 80 ml. portions of ethyl acetate. The ethyl acetate solution was dried over magnesium sulfate after washing with water. The resulting solution was evaporated under reduced pressure at 40°. There was obtained (R,S)-2-[(p-methoxyphenyl)acetoxy]valeric acid as an oil.

In a manner analogous to that described in Example 1 there was obtained from the (R,S)-2-[(p-methoxyphenyl)acetoxy]-valeric acid thus-formed [(R,S)-1-[(p-methoxyphenyl)acetoxy]butyl] penicillin sodium; melting point ca 150° (decomposition); $[\alpha]_D^{25} = +188°$ ($c = 2.0$ in water).

EXAMPLE 3

A total of 9 g. of (R,S)-2-[(p-acetamidophenyl)-acetoxy]valeric acid prepared via its benzyl ester in a manner analogous to that described in Example 2 was dissolved in 60 ml. of tetrahydrofuran and 4.3 ml. of triethylamine. 4.2 Grams of chloroformic acid isobutyl ester were added dropwise over a period of 10 minutes at −12° with stirring. The mixture was stirred for a further 20 minutes at −12°. A solution of 6.7 g. of 6-aminopenicillanic acid in a mixture of 80 ml. of chloroform and 8.6 ml. of triethylamine was cooled to −10° and added to the mixture which was stirred for 1 hour at a temperature of −10° to 0° and for an additional 3 hours at 20°.

The suspension was thereafter evaporated under reduced pressure at 20°, the residue dissolved in 100 ml. of ice-water and washed twice with 50 ml. portions of ethyl acetate. The pH of the aqueous solution was adjusted to pH 2 at 0° with 3-N sulfuric acid and extracted twice with 100 ml. portions of ethyl acetate. The ethyl acetate solutions were combined and washed 3 times with 50 ml. portions of 10% aqueous sodium chloride solution, dried over magnesium sulfate and evaporated under reduced pressure at 20°. The resulting oil was dissolved in 10 ml. of ethyl acetate, treated with 15 ml. of a 2-N solution of sodium 2-ethylcaproate in ethyl acetate and the sodium salt precipitated completely with 200 ml. of absolute ether. The precipitate was filtered off under suction, washed with absolute ether and dried at 20°. The product thus-obtained was dissolved in 50 ml. of water, treated with 100 ml. of isopropanol, evaporated under reduced pressure at 20° to an oil and treated with three 50 ml. portions of fresh isopropanol evaporating after each treatment. The resulting oil was dissolved in 200 ml. of isopropanol and maintained for 12 hours at −20°. The crystals which formed were filtered off under suction and discarded. The filtrate was evaporated under reduced pressure at 20° to about 80 ml. and precipitated with 300 ml. of absolute ether. The precipitate was filtered off under suction, washed with 100 ml. of absolute ether and dried at 20° to yield [(R,S)-1-[(p-acetamidophenyl)acetoxy]butyl]-penicillin sodium; melting point ca 150° (decomposition); $[\alpha]_D^{25} = +168.5°$ ($c = 2.0$ in water).

EXAMPLE 4

In a manner analogous to that described in Example 1 there was obtained utilizing (R)-2-[(m-tolyl)acetoxy] isocaproic acid which was prepared via its benzyl ester [(R)-3-methyl-1-[(m-tolyl)acetoxy]butyl]-penicillin sodium; melting point ca 195° (decomposition); $[\alpha]_D^{25} = +199.2°$ ($c = 2.0$ in water).

EXAMPLE 5

In a manner analogous to that described in Example 1 there was obtained utilizing (R)-2-[(p-methoxyphenyl)acetoxy]isocaproic acid which was prepared via its benzyl ester [(R)-1-[(p-methoxyphenyl)acetoxy]-3-methylbutyl]penicillin sodium; melting point 190° (decomposition); $[\alpha]_D^{25} = +214°$ ($c = 2$ in water).

EXAMPLE 6

In a manner analogous to that described in Example 1 there was obtained from (R)-2-(phenylacetoxy) isocaproic acid which was prepared via its benzyl benzyl ester [(R)-1-[(p-chlorophenyl)acetoxy]-3-methylbutyl]penicillin sodium; melting point 195° (decomposition); $[\alpha]_D^{25} = +206.5°$ ($c = 2$ in water).

EXAMPLE 7

In a manner analogous to that described in Example 1 there was obtained from (R)-2-(phenylacetoxy)isocaproic acid which was prepared via its benzyl ester [(R)-3-methyl-1-(phenylacetoxy) butyl]penicillin sodium; melting point ca 140° (decomposition); $[\alpha]_D^{25} = +223°$ ($c = 2.0$ in water).

EXAMPLE 8

The following formulation was prepared and filled into gelatin capsules

| | |
|---|---|
| [(R)-3-methyl-1(phenylacetoxy)-butyl]penicillin sodium | 520 mg. |
| Luviskol[1] | 29 mg. |
| Mannitol | 20 mg. |
| Talc | 19 mg. |
| Magnesium stearate | 2 mg. |
| Total | 590 mg. |

[1]A polyvinyl pyrrolidone product manufactured by Badische Anilin u. Sodafabrik, Ludwigshafen am Rhein, German Federal Republic.

The active ingredient was homogeneously blended with the LUVISKOL and mannitol and compressed into slugs. The slugs were then passed through a suitable sieving machine and, after blending with the talc and magnesium stearate, filled into suitable gelatin capsules.

EXAMPLE 9

Reconstitutable injectable preparations were prepared by forming a solution containing 260 mg. [(R)-3-methyl-1-(phenylacetoxy)-butyl]penicillin sodium, 1.1 mg. p-hydroxybenzoic acid methyl ester and 0.135 mg. p-hydroxybenzoic acid propyl ester, sterilizing solution by sterile filtration, filling 2.0 ml. thereof aseptically into suitable ampules, lyophilizing the solution and hermetically sealing the ampules. In use, the lyophilized product is reconstituted with 2.0 ml. of water for injection to a total volume of 2.2 ml.

We claim:
1. A compound selected from those represented by the formula

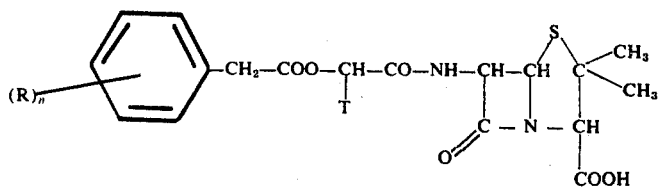

wherein R is halogen, lower alkyl, lower alkoxy, lower alkylamino, di-lower alkylamino or lower alkanoylamino, $n$ is an integer of 0-2 and T is a $C_2$–$C_5$ alkyl group, pharmaceutically acceptable salts and hydrated forms thereof.

2. A compound in accordance with claim 1 wherein $n$ is 1 and R is selected from the group consisting of chloro, methyl, methoxy, acetylamido and dimethylamino.

3. A compound in accordance with claim 1 wherein $n$ is 0.

4. A compound in accordance with claim 1 wherein T is an isobutyl group.

5. A compound in accordance with claim 1 wherein the group

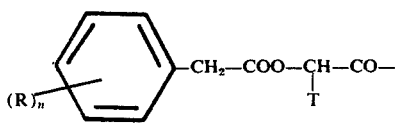

has the R configuration.

6. A compound in accordance with claim 1 wherein said compound is [(R)-1-[(o-methoxyphenyl)acetoxy]-3-methylbutyl]penicillin sodium.

7. A compound in accordance with claim 1 wherein said compound is [(R,S)-1-[(p-methoxyphenyl)acetoxy]butyl]penicillin sodium.

8. A compound in accordance with claim 1 wherein said compound is [(R,S)-1-[(p-acetamidophenyl)acetoxy]butyl]penicillin sodium.

9. A compound in accordance with claim 1 wherein said compound is [(R)-1-[(p-methoxyphenyl)acetoxy]-3methylbutyl]penicillin sodium.

10. A compound in accordance with claim 1 wherein said compound is [(R)-1-[(p-chlorophenyl)acetoxy]-3-methylbutyl]penicillin sodium.

11. A compound in accordance with claim 1 wherein said compound is [(R)-3-methyl-1-(phenylacetoxy)butyl] penicillin sodium.

* * * * *